Patented Nov. 13, 1945

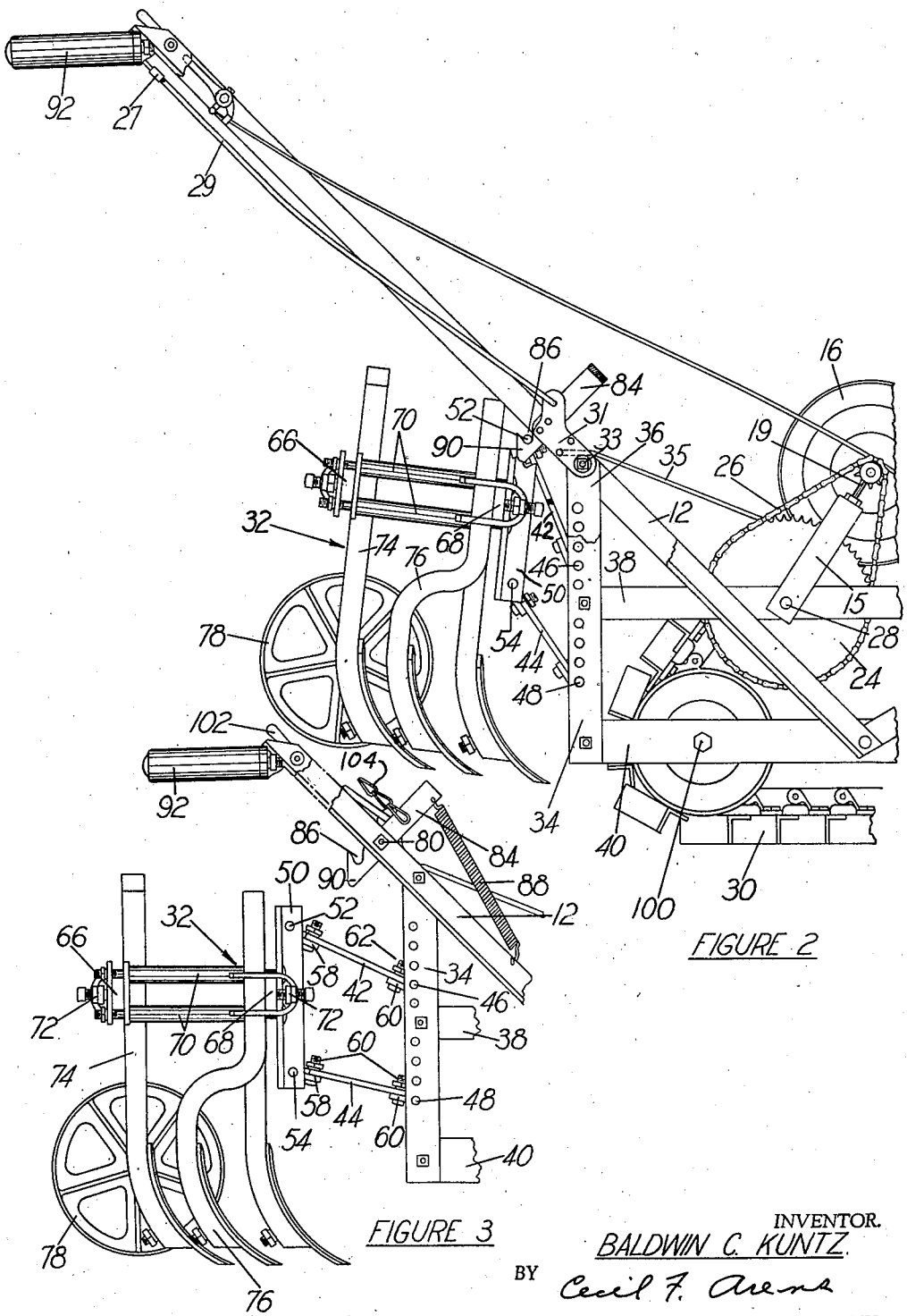

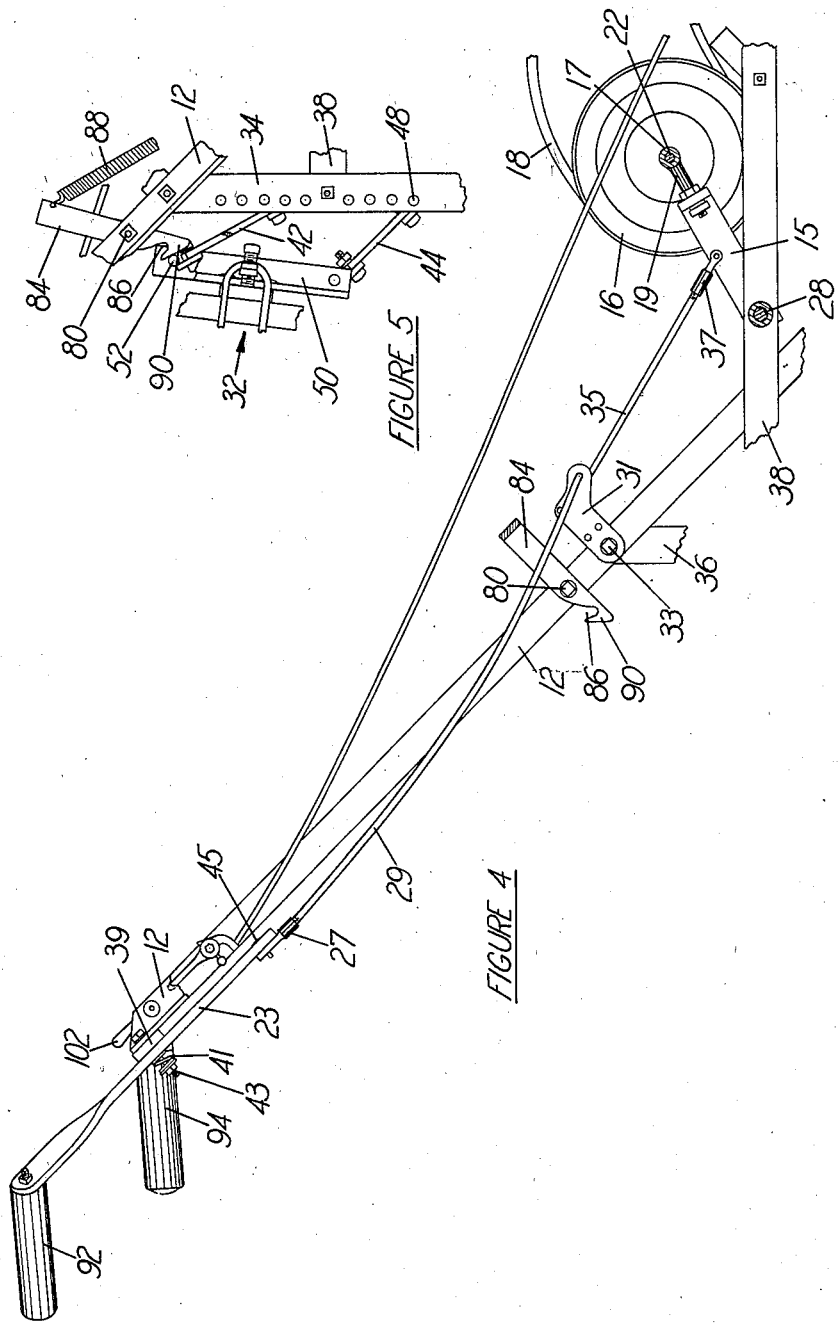

2,388,981

UNITED STATES PATENT OFFICE 2,388,981

IMPLEMENT HITCH

Baldwin C. Kuntz, Juneau, Wis., assignor, by mesne assignments, to Automatic Products Company, Milwaukee, Wis., a corporation of Wisconsin Application January 24, 1942, Serial No. 428,031

3 Claims. (Cl. 97—48)

This invention relates in general to tractors equipped to carry tools or implements for farming. More specifically it relates to tractors of the type utilizing a power plant for pulling same but followed by the operator.

It is an object of this invention to provide a tractor of the power type having a drive mechanism which can be disconnected from the ground engaging traction wheels by a simple operation of the guiding handles.

Still another object of the present invention is the provision of means for lifting the implement or tool from its ground engaging position to enable the operator to negotiate a turn or otherwise place the tool into a non-operable position.

In the drawings,

Figure 2 is a side elevational view of the tractor with parts broken away to more clearly exemplify the improvements of this invention.

Figure 3 is a fragmentary view of the tractor showing the cultivator rig in ground engaging position.

Figure 4 is a fragmentary view of the tractor indicating the parts and positions of same when the driven sheave is out of engagement with the driving sheave.

Figure 5 is a fragmentary view showing the relative positions of the detent arm and shaft when the rear end of the tractor is being lowered to engage the cultivator rig.

Figure 1:
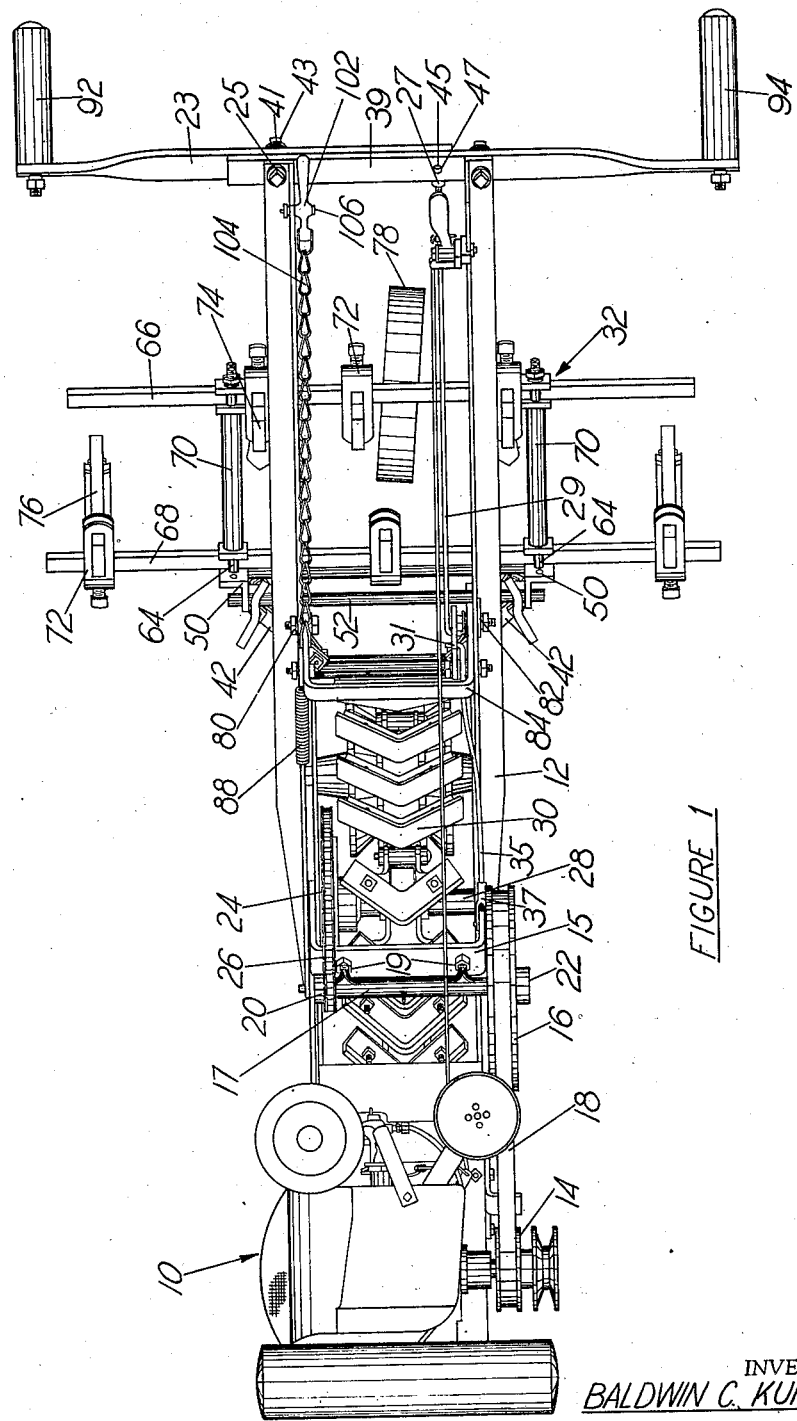
Figure 1 is a top plan view of a tractor of the type incorporating the present invention.

For purpose of illustration, the improvements of this invention are shown associated with a garden tractor of the single tread endless-track-laying type or creeper as it is sometimes called. Tractors of this type are generally driven by gasoline engines 10 or other prime movers which are securely fixed to a main frame 12 in any suitable manner consistent with the art. The main frame includes horizontal members 38 and 40 joined at the rear ends thereof by a vertical member 34 which extends above a horizontal member 38 for a sufficient distance to provide a point of attachment for arms bearing handles 92 and 94. A driving sheave 14 keyed to the shaft of the prime mover 10 drives the driven sheave 16 through the belt 18. A driving sprocket 20 is keyed to the same shaft 22 as the driven sheave 16, and drives a driven sprocket 24 by means of a chain 26. The sprocket 24 is keyed to a shaft 28 which is associated with an endless track or tread 30 for propelling the tractor. A cultivator rig or implement mounting generally indicated at 32 is attached to and carried by the main frame 12 and includes vertical members 34 and 36 and the horizontal members 38 and 40.

The implement mounting 32 is movably and floatably associated with the tractor by the connecting links 42 and 44 which are connected to the shafts 46 and 48 respectively which shafts are pivoted in the members 34 and 36 of the main tractor frame 12. The other ends of the links 42 and 44, respectively, are connected with shafts 52 and 54 which are pivotally mounted in vertical members 50 which are in the form of angle irons. The shafts 46, 48, 52 and 54 provide pivotal means for vertically shifting the cultivator rig or implement mounting. But to allow for lateral movement of the implement so that it may be adjusted as determined by the crop rows, these links 42 and 44 are pivoted to lugs 58 and 60 which are securely fixed to the shafts 46, 48, 52 and 54. The lugs 58 and 60 and the links 42 and 44 are drilled for the reception of bolts 62 which form pivot bearings for said lugs and links aforementioned. The vertical members or angle irons 50 have studs 64 associated therewith and adapted to support the rig or tool beams 66 and 68 which are maintained in spaced relationship by separating sleeves 70. Adjusting clamps 72 are adapted to slide on the rig beams 66 and 68 to provide lateral adjustment of the tools 74 and 76 which are vertically adjustable in said clamps. A gage wheel 78 is adjustably associated with the rig beams 66. In the above description, the elements 46, 48, 52 and 54 are designated as shafts providing pivoting means in the implement hitch. It will be understood that such elements function merely as rods pivoting or rocking through relatively small arcs of movement rather than as shafts rotating through entire revolutions.

Pivoted to the main frame 12 at 80 and 82 is a detent arm 84 having cut out portions or notches 86 suited to engage the shaft 52 and hold the cultivator rigging in suspended position and out of ground engaging or operating position as shown in Figure 2. A spring 88 engages the main frame 12 and arm 84 and biases said arm so that the face 90 of the arm 84 will contact the shaft 52 when the handle end of the tractor is lowered. See Figure 5. In lowering the tractor to engage the cultivator rigging the operator pushes downwardly on the guide handles 92 and 94 which rocks or pivots the tractor about the axis 100. To disengage the shaft 52 from the arm 84 a lever 102 is disposed in proximity to the handles 92 and 94 by which the operator guides the machine and is connected to the arm 84 by a chain 104. Rotation toward the operator of the lever 102 will pivot the detent arm 84 counterclockwise about pivot 80 and disengage the arm from the shaft 52 whereby the cultivator rig is dropped to the position shown in Figure 3 for cultivating or other operations suited to the tool in use. The lever 102 is pivotally mounted to the main frame 12 in any suitable manner such as by a bolt 106 which engages the frame. This cultivator rigging or rig engaging means enables an operator of the tractor to lift the cultivator out of engagement with the ground without removing his hands from the handles 92 and 94 or stopping the machine to perform the operation. It is not necessary to operate hand or foot levers to raise the cultivator from its ground engaging position.

The present invention also contemplates the provision of structure by which the transmission of power from the prime mover 10 to the endless track 30 may be interrupted when forward motion of the machine is to be stopped. Such structure includes the U shaped element 15, which is pivoted on the shaft 28 to which the driven sprocket 24 is keyed and supports the shaft 22 to which the driving sprocket 20 and driven sheave 16 are fixedly secured. The shaft 22 has its bearing in a sleeve 17 which has studs 19 integrally associated therewith and threadedly engaged with the U shaped element 15. The handle 92 is associated with one end of a lever arm 23 which is pivoted at 25. The other end of the lever arm 23 has a lug 27 pivotally related therewith and recessed for the reception of a first rod 29 which is connected to a bell crank 31 which is rotatably fixed to the frame 12 at 33. A second rod 35 joins the bell crank 31 with the U shaped element 15. A bifurcated adjusting member 37, is adjustably associated with the rod 35 and U shaped element 15. The transverse movable arm 23 is held in frictional relationship with a transverse member 39 by a coiled spring 41 which encircles a bolt 43. A projection 45 on the lever arm 23 cooperates with the opening 47 of a transverse fixed member 39 and holds the members 23 and 39 in locked relationship.

To disengage the sheave 16 from driven relationship with the sheave 14 the U shaped arm 15 is rotated clockwise about the shaft 28 as viewed in Figure 2. Rotating the U shaped arm 15 in this manner also rotates the sheave 16 about the same axis whereby the belt 18 which drives the sheave 16 is no longer in driving engagement with said sheave. As viewed in Figures 1 and 4 rotating the transverse movable arm clockwise about its axis 25 pivots the bell crank 31 about 33 and urges the rod 35 forward which rotates the U shaped member 15 clockwise as viewed in Figure 2 and disengages the sheave 16 from the belt 18.

Having described my invention, I claim:

1. In a tractor including a main frame and handles extending therefrom for guiding the tractor, an implement hitch comprising a cultivator rigging including a plurality of members extending substantially vertically and a shaft pivotally supported therebetween, means connecting said shaft with said frame for relative vertical movement between said frame and said rigging, a detent pivotally mounted on said frame for engaging and holding said rigging above the operating position thereof, a spring biasing said detent into position for engagement with said rigging shaft, and means for releasing said rigging from said detent against the action of said spring whereby said rigging comes to the operating position thereof.

2. In a tractor including a main frame and handles extending therefrom for guiding the tractor, said frame having a shaft pivotally supported therein, an implement hitch comprising a cultivator mounting including a plurality of members extending substantially vertically and a shaft pivotally supported therebetween, a link connecting said frame shaft with said mounting shaft for relative vertical movement therebetween, a detent pivotally mounted on said frame for engaging said mounting shaft, a spring biasing said detent into one position, and a lever mounted adjacent said handles for releasing said detent against the action of said spring.

3. In a tractor including a main frame and handles extending therefrom for guiding the tractor, said frame having vertical members pivotally supporting a plurality of substantially parallel shafts therebetween, an implement hitch comprising a cultivator mounting including a plurality of members extending substantially vertically and a plurality of substantially parallel shafts pivotally supported therebetween, links connecting one of said frame shafts with one of said mounting shafts in pairs for relative and substantially parallel movement between said frame and said mounting, a detent pivoted on said handles for holding said mounting above the operating position, a spring biasing said detent into latching relation with one of said mounting shafts, and a lever mounted upon said handles to disengage said detent for releasing said mounting into operating position against the action of said spring.

BALDWIN C. KUNTZ.